(12) United States Patent
Rubinstein et al.

(10) Patent No.: US 9,916,629 B2
(45) Date of Patent: Mar. 13, 2018

(54) IDENTIFYING ONE OR MORE RELEVANT SOCIAL NETWORKS FOR ONE OR MORE COLLABORATION ARTIFACTS

(71) Applicant: International Business Machines Corporation, Armonk, NY (US)

(72) Inventors: Peter I. Rubinstein, Westford, MA (US); Asima Silva, Holden, MA (US); Robert C. Weir, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 13/859,485

(22) Filed: Apr. 9, 2013

(65) Prior Publication Data
US 2014/0304254 A1 Oct. 9, 2014

(51) Int. Cl.
*G06F 17/30* (2006.01)
*G06Q 50/00* (2012.01)
(Continued)

(52) U.S. Cl.
CPC ....... *G06Q 50/01* (2013.01); *G06F 17/30386* (2013.01); *G06F 17/30861* (2013.01);
(Continued)

(58) Field of Classification Search
CPC ......... G06F 17/30867; G06F 17/30864; G06F 17/30861
(Continued)

(56) References Cited

U.S. PATENT DOCUMENTS 7,657,542 B2 2/2010 Sundararajan et al.
8,073,793 B2 * 12/2011 Galvin ................. G06Q 10/107
705/80
(Continued)

FOREIGN PATENT DOCUMENTS

CN 101252731 A 8/2008
CN 101115586 A 5/2010
(Continued)

OTHER PUBLICATIONS

Bank, Jacob et al., Calculating the Jaccard Similarity Coefficient with Map Reduce for Entity Pairs in Wikipedia, Dec. 16, 2008, 18 pages, Cornell Web Lab <http://weblab.infosci.cornell.edu/papers/Bank2008.pdf>.

(Continued)

*Primary Examiner* — Frantz Coby
(74) *Attorney, Agent, or Firm* — Jordan IP Law, LLC

(57) ABSTRACT

Methods, products, apparatus, and systems may provide for identifying a set of users associated with one or more collaboration artifacts. Additionally, a set of networks including a plurality of candidate social networks may be identified. Moreover, a relationship strength may be determined between the set of users associated with the one or more collaborations artifacts and each of the candidate social networks to identify one or more relevant social networks from the candidate social networks. Determining the relationship strength may include calculating a similarity metric. In addition, at least one member affiliated with the one or more relevant social networks may become aware of the collaboration artifact.

12 Claims, 3 Drawing Sheets

(51) Int. Cl.
*G06Q 10/10* (2012.01)
*H04L 12/58* (2006.01)
*H04L 29/08* (2006.01)

(52) U.S. Cl.
CPC .. *G06F 17/30864* (2013.01); *G06F 17/30867* (2013.01); *G06Q 10/101* (2013.01); *H04L 51/04* (2013.01); *H04L 67/10* (2013.01); *H04L 67/22* (2013.01)

(58) Field of Classification Search
USPC ........ 707/758, 737, 736, 749, 732; 709/204, 709/206
See application file for complete search history.

(56) References Cited

U.S. PATENT DOCUMENTS

| | | | |
|---|---|---|---|
| 8,549,414 B2 | 10/2013 | Hoard et al. | |
| 8,682,918 B2* | 3/2014 | Ramanujam | 707/758 |
| 8,954,500 B2* | 2/2015 | Marlow | G06Q 10/10 705/319 |
| 9,230,014 B1* | 1/2016 | Peintner | G06F 17/30702 |
| 2009/0125230 A1* | 5/2009 | Sullivan | G01S 5/0072 701/408 |
| 2009/0138806 A1* | 5/2009 | Galvin | G06Q 50/188 715/753 |
| 2009/0164267 A1* | 6/2009 | Banatwala | G06F 17/30997 707/736 |
| 2009/0254817 A1 | 10/2009 | Dreyfus et al. | |
| 2009/0271244 A1* | 10/2009 | Kalasapur | G06Q 10/107 705/319 |
| 2009/0319288 A1* | 12/2009 | Slaney | G06Q 30/02 705/1.1 |
| 2010/0049682 A1* | 2/2010 | Chow | G06Q 30/0631 706/46 |
| 2010/0241698 A1* | 9/2010 | Hillerbrand | H04L 41/00 709/203 |
| 2011/0119230 A1 | 5/2011 | Zuber | |
| 2011/0131536 A1 | 6/2011 | Peng et al. | |
| 2011/0282855 A1 | 11/2011 | Ronen et al. | |
| 2012/0110083 A1* | 5/2012 | Burritt | G06Q 50/01 709/204 |
| 2012/0158935 A1 | 6/2012 | Kishimoto et al. | |
| 2012/0246574 A1* | 9/2012 | Hoard | G06Q 50/01 715/751 |
| 2013/0007634 A1* | 1/2013 | Galvin, Jr. | G06Q 50/01 715/753 |
| 2013/0013713 A1* | 1/2013 | Shoham | 709/206 |
| 2013/0218966 A1 | 8/2013 | Jakobson | |
| 2013/0275429 A1* | 10/2013 | York et al. | 707/737 |
| 2013/0326362 A1 | 12/2013 | Murray et al. | |
| 2014/0149504 A1* | 5/2014 | Bosworth et al. | 709/204 |
| 2014/0337436 A1* | 11/2014 | Hoagland et al. | 709/204 |

FOREIGN PATENT DOCUMENTS

| | | |
|---|---|---|
| CN | 102172007 A | 8/2011 |
| WO | WO2013036856 A2 * | 3/2013 |

OTHER PUBLICATIONS

Wikipedia Contributors, Jaccard Index, Wikipedia: The Free Encyclopedia, Apr. 1, 2013, 3 pages, Wikipedia: The Free Encyclopedia, <en.wikipedia.org/wiki/Jaccard_index>.
Wikipedia Contributors, Sorensen-Dice coefficient, Wikipedia: The Free Encyclopedia, Mar. 24, 2013, 2 pages, Wikipedia: The Free Encyclopedia, <en.wikipedia.org/wiki/Dice%27s_coefficient>.
International Search Report for PCT Application No. PCT/CA2014/050195. Mailed on Jul. 4, 2014, 4 pages.
International Written Opinion for PCT Application No. PCT/CA2014/050195. Mailed on Jul. 4, 2014, 10 pages.
Non-Final Office Action for U.S. Appl. No. 14/496,989, dated Jul. 30, 2015, 21 pages.
Office Action for U.S. Appl. No. 14/496,989, dated Feb. 16, 2016, 17 pages. United States Patent and Trademark Office.
Final Office Action for U.S. Appl. No. 14/496,989, dated Sep. 9, 2016, 22 pages. United States Patent and Trademark Office.
Office Action for U.S. Appl. No. 14/496,989, dated May 9, 2017, 24 pages.
Final Rejection dated Dec. 1, 2017 in U.S. Appl. No. 14/496,989, 16 pages.

* cited by examiner

IDENTIFYING ONE OR MORE RELEVANT SOCIAL NETWORKS FOR ONE OR MORE COLLABORATION ARTIFACTS

BACKGROUND

Embodiments of the present invention generally relate to identifying one or more relevant social networks for one or more collaboration artifacts. More particularly, embodiments relate to determining a relationship strength between a set of users associated with one or more collaborations artifacts and each of a plurality of candidate social networks to identify one or more relevant social networks for one or more collaboration artifacts.

A collaboration artifact may enable cooperation between two or more users. For example, a document may be shared between cooperating users to achieve a goal and/or to further a purpose of the document. In addition, a social network may be used to share information. Mechanisms used to share information across a social network, however, may result in a minimized and/or an incorrect set of cooperating users. Also, mechanisms used to share information across a social network may detect and/or make relationships (e.g., associations) independently of the strength of the relationship and/or independently of an evaluation of a plurality of candidate social networks. Accordingly, there may be inefficiencies to achieve the goal and/or the purpose of the collaboration artifact.

BRIEF SUMMARY

Embodiments may include a method involving identifying a set of users associated with one or more collaboration artifacts. The method may also provide for identifying a set of networks including a plurality of candidate social networks. In addition, the method may include determining a relationship strength between the set of users associated with the one or more collaborations artifacts and each of the candidate social networks. The method may include identifying one or more relevant social networks from the candidate social networks.

Embodiments may include a computer program product having a computer readable storage medium and computer usable code stored on the computer readable storage medium. If executed by a processor, the computer usable code may cause a computer to identify a set of users associated with one or more collaboration artifacts. The computer usable code, if executed, may also cause a computer to identify a set of networks including a plurality of candidate social networks. The computer usable code, if executed, may also cause a computer to determine a relationship strength between the set of users associated with the one or more collaborations artifacts and each of the candidate social networks. The computer usable code, if executed, may identify one or more relevant social networks from the candidate social networks.

Embodiments may include a computer program product having a computer readable storage medium and computer usable code stored on the computer readable storage medium. If executed by a processor, the computer usable code may cause a computer to identify a set of users associated with one or more collaboration artifacts. The computer usable code, if executed, may also cause a computer to identify a set of networks including a plurality of candidate social networks. The computer usable code, if executed, may also cause a computer to calculate a similarity metric between the set of users associated with the one or more collaborations artifacts and each of the candidate social networks. The computer usable code, if executed, may identify one or more relevant social networks from the candidate social networks. In addition, the computer usable code, if executed, may cause one or more members affiliated with the one or more relevant social networks to become aware of the one or more collaboration artifacts.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
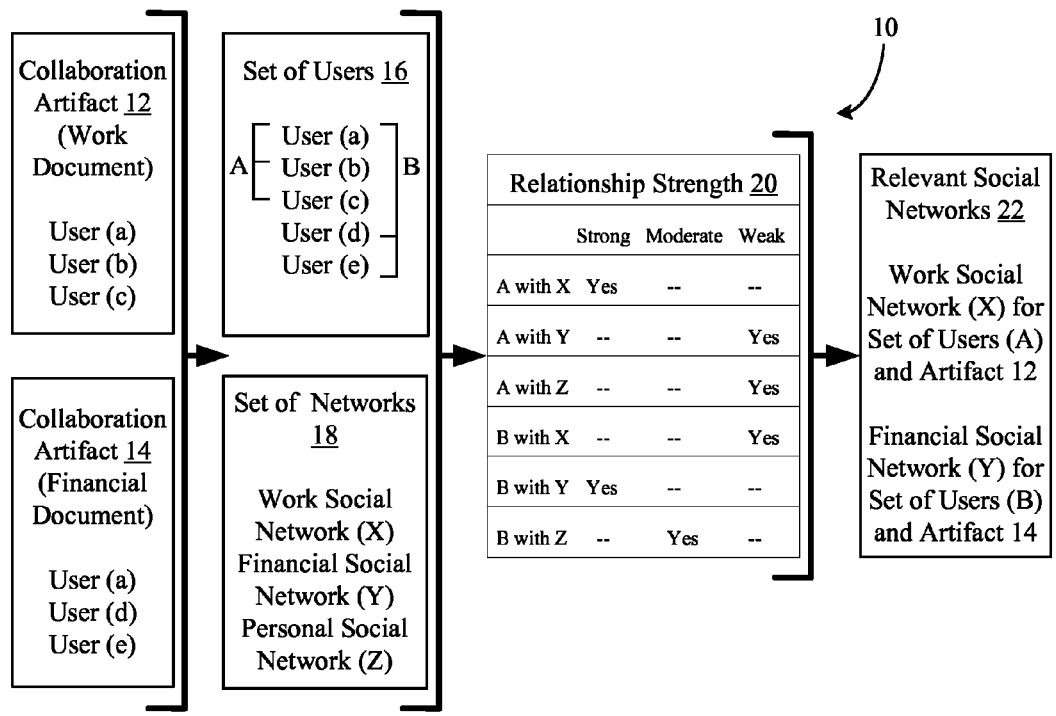
FIG. 1 is a block diagram of an example of a scheme of identifying one or more relevant social networks for one or more collaboration artifacts according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a scheme 10 is shown of identifying one or more relevant social networks for one or more collaboration artifacts according to an embodiment. A collaboration artifact may include any work product that enables cooperation between two or more users. Examples of a collaboration artifact may include a browser, an instant message, a chat, an email, a file, a post, a presentation, a spreadsheet, and so on, or combinations thereof. In one example, a document may be shared between cooperating users to achieve a goal and/or to further a purpose of the document. The collaboration artifact may include a portion based on any level of granularity. For example, the collaboration artifact may include a chapter of a document, a section of a document, and so on, or combinations thereof. The collaboration may involve any aspect of a cooperation, such as reviewing, editing, revising, adding, deleting, modifying, authoring, posting, responding, highlighting, forwarding, redacting, rendering an opinion, rating, recommending, and so on, or combinations thereof.

When faced with one or more collaboration artifacts, it may be valuable to know if there are one or more social networks that are closely related to the artifacts. Such information may enable the artifact to be shared across one or more social networks while providing a maximized and/or an appropriate set of cooperating users. For example, in the context of text-editing, knowledge related to a social network that is closely related (e.g., most closely related) to the cooperating users (e.g., co-authors) associated with a collaboration artifact (e.g., document) may be useful to suggest additional reviewers, to search for related resources within that social network, to make the users of the closely related social network aware of the artifact, to make the collaboration artifact available to the users, and so on, or combinations thereof. In the illustrated example, a collaboration artifact 12 and a collaboration artifact 14 may be identified and/or received.

The collaboration artifact 12 may include a work document, such as a presentation or a text document, having associated cooperating users (a), (b), and (c). The collaboration artifact 14 may include a financial document, such as a financial statement, having associated cooperating users (a), (d), and (e). Accordingly, a set of users 16 may be identified to include the users (a), (b), (c), (d), and (e) associated with the collaboration artifacts 12 and 14. A set of users (A) may also be identified having the users (a), (b), and (c) associated with the collaboration artifact 12 and a set of users (B) may be identified having the users (a), (d), and (e) associated with the collaboration artifact 14, wherein the user (a) may be associated with each of the collaboration artifacts 12 and 14. The users (a), (b), (c), (d), and/or (e) may be identified by any information, such a name, an address, an author, a recipient, a co-author, an originator, a reviewer, a participant, a tag, metadata, an access list, and so on, or combinations thereof.

A set of networks 18 may be identified including a plurality of candidate social networks (X), (Y), and (Z). Generally, any candidate social network may include an online social network, such as intranet social network and/or internet social network, where users may interact and/or establish relationships with each other. For example, a social intranet network may include a social community of employees able to communicate over an internal employer computer network. Internet social networks may include, for example, FACEBOOK®, TWITTER®, LINKEDIN® (registered trademarks of Facebook, Twitter, and Linkedin, respectively) web sites. In addition, internet social networks may include question-and-answer (Q&A) web sites, such as QUORA®, YAHOO!® ANSWERS, and STACK OVERFLOW® (registered trademarks of Quora, Yahoo, and Stack Overflow, respectively). Any candidate social network may also include two or more people (e.g., a group) that communicate based on one or more criteria, such as shared interests, particular subjects, and so on, or combinations thereof. For the purpose of illustration, a candidate social network may include two or more users that "like" a particular FACEBOOK® web page. In addition, any candidate social network may include two or more people that express a relationship with each other, such as a professional, personal, familial, geographic, and/or educational relationship. Users of a candidate social network may further establish relationships with each other, such as by joining a group, becoming "friends", and/or establishing a "connection." One or more of the candidate social networks may be pre-existing social networks.

Any candidate social network in the set of networks 18 may be identified using network information, such as a mailing list, a database access list (ACL), an organization chart, an organization group, a membership, a communication record, metadata, a static group, a dynamic group, a nested group, a hybrid group, a Lightweight Directory Access Protocol (LDAP) group, an opinion associated with a post, and so on, or combinations thereof. For the purpose of illustration, the set of networks 18 may include a candidate work social network (X), a candidate financial social network (Y), and a candidate personal social network (Z). The candidate work social network (X) may include, for example, two or more users related by employment (e.g., employees of the same organization) such that it may be identified using an organizational chart. The candidate financial social network (Y) may include, for example, two or more users related by finances (e.g., associated with the same financial institution) such that it may be identified by a mailing list. The personal social network (Z) may include, for example, two or more users related by personal interests (e.g., members of the same social web site) such that it may be identified by an opinion (e.g., "like", "thumbs up", "favorite", textual comment, etc.) associated with a post.

A relationship strength 20 may be determined between the set of users (A), (B) associated with the respective collaborations artifacts 12, 14 and each of the candidate social networks (X), (Y), and (Z). In one example, a similarity metric may be calculated to determine the relationship strength, as described in detail below. In the illustrated example, the relationship strength 20 may include a strong relationship strength, a moderate relationship strength, and/or a weak relationship strength. The particular value (e.g., strong) may include a machine-readable value, an integer, and so on, or combinations thereof. The relationship strength 20 may be determined to hold a particular value (e.g., strong) based on a threshold, such as a threshold number of users associated with the collaboration artifact that are also in the candidate social network. The threshold number may be set on a scale, such as where 0 may indicate no overlap in users and 1 may indicate complete overlap in users. The threshold for a particular value may be set relatively low or relatively high, such that the relationship strength 20 may be determined to hold the particular value (e.g., strong, weak, etc.) where there is complete overlap, half overlap, quarter overlap, no overlap, and so on, or combinations thereof.

The relationship strength 20 may also be determined to hold a particular value based on relative evaluations (e.g., strongest relationship strength where there is the most relative overlap). In addition, the relationship strength may be determined to hold a particular value based on weight information for each candidate social network. The weight information may include a number of total members in the candidate social network, expertise of the members in the candidate social network, and on, or combinations thereof. For example, where there are twenty total users in one candidate social network and hundreds in a second candidate social network, one or more of the candidate social networks may be weighted to account for the size of the sets (e.g., to normalize the sets, to give greater and/or less weight to the sets, etc.). Moreover, any criteria may be used to supplement the relationship strength determination (whether automatic or manual), such as user preference information, history information, network reliability information, user reliability information, and so on, or combinations thereof.

For the purpose of illustration, a strong relationship strength between the set of users (A) and the candidate work social network (X) may be determined when the candidate work social network (X) includes each of the users (a), (b), and (c). Similarly, a strong relationship strength between the set of users (B) and the candidate financial social network (Y) may be determined when the candidate financial social network (Y) includes each of the users (a), (d), and (e). In addition, a moderate relationship strength between the set of users (B) and the candidate personal social network (Z) may be determined when the candidate personal social network (Z) includes two of the users (a), (d), and (e). The difference in the relationship strength between the set of users (B) and the candidate social networks (Y), (Z) may arise, for example, where each of the users (a), (d), and (e) bank at the same financial institution but only two of the users (a), (d), and (e) are members of the same social network web site.

The relationship strength 20 may be used to identify one or more relevant social networks 22 from the candidate social networks (X), (Y), and (Z) for the set of users (A) and (B), and therefore for the respective associated collaboration artifacts 12 and 14. In one example, each of the candidate social networks (X), (Y), and (Z) may be sorted based on their corresponding relationship strength (e.g., strong, moderate, weak, none, etc.) to identify the relevant social networks 22. Each of the candidate social networks (X), (Y), and (Z) may be sorted in descending or ascending order, for example in descending order from a strong relationship strength to a weak relationship strength. The sorting may involve partitioned ordering, such as where the candidate social network (X) may be a first entry followed by the candidate social networks (Y) and/or (Z) for the set of users (A), and where the candidate social network (Y) may be the fourth entry followed by the candidate social network (Z) and (X) for the set of users (B).

The sorting may involve separate ordering for the set of users (A) and (B), such as where the candidate social network (X) for the set of users (A) and the candidate social network (Y) for the set of users (B) are each the first entry. The sorting may also involve mixed ordering, such as where either of the candidate social networks (X) for the set of users (A) and (Y) for the set of users (B) may be the first entry, where the other of the candidate social networks (X) and (Y) may be the second entry, and where the candidate social network (Z) for the set of users (B) may be the third entry. Any other criteria may be considered to implement the sorting (whether manual or automatic), such as predetermined limitations (e.g., sort the largest networks first, the networks with the most educated members first, etc.), user preference information (e.g., sort from strongest to weakest, etc.), history information (e.g., prior sorting), member reliability information (e.g., member ratings), network reliability information (e.g., network ratings), and so on, or combinations thereof. The sorting may be implemented before, during, after, and/or irrespective of any selecting, which is described below.

Each of the candidate social networks (X), (Y), and (Z) may be selected based on their corresponding relationship strength (e.g., strong, moderate, weak, none, etc.) to identify the relevant social networks 22. Any of candidate social networks (X), (Y), and (Z) may be selected before, during, after, and/or irrespective of any sorting, as described above. The selection may involve automatic selection, manual selection, and so on, or combinations thereof. For the purpose of illustration, the candidate work social network (X) may be automatically selected as the relevant social network 22 for the set of users (A) (and/or the collaboration artifact 12) based on its corresponding relationship strength 20 (e.g., strong relationship strength). The selection may involve input from one or more users, such as where an unsorted list of the candidate social networks (X), (Y), and (Z) with their corresponding relationship strengths are provided to the one or more users for manual selection. Any other criteria may be considered to implement the selecting (whether manual or automatic), such as predetermined limitations (e.g., limiting the social network type, network number, always select the first entry, always select the strongest relationship strength, etc.), user preference information (e.g., sort the professional networks first, etc.), history information (e.g., prior selecting), member reliability information (e.g., member ratings), network reliability information (e.g., network ratings), and so on, or combinations thereof.

Accordingly, unsorted information, sorted information, unselected information, and/or selected information may be provided to one or more users, to one or more logic, and/or stored. For example, such information may be provided to one or more users as an attachment to a message, as a link, in a shared folder and/or environment, on a display of a user platform, and so on, or combinations thereof. For the purpose of illustration, the candidate work social network (X) for the set of users (A) and the candidate financial social network (Y) for the set of users (B) may be automatically sorted, selected, and/or provided to one or more users, provided to logic, stored for retrieval, for editing, for re-ordering, for approval, and so on, or combinations thereof. A same and/or different data storage may be used to store information corresponding to the collaboration artifacts 12 and/or 14, the set of users (A) and/or (B), the set of networks 18, and/or the relationship strength 20. The data storage may involve a data structure such as a database, a table, and so on, or combinations thereof.

At least one member affiliated with the relevant social networks 22 may become aware of the collaboration artifact 12 and/or the collaboration artifact 14. Users of a relevant social network may establish relationships with each other, such as by joining a group, becoming "friends", and/or establishing a "connection", and therefore may be affiliated members of the relevant social network. In addition, using a relevant social network may cause the user to be an affiliated member of the relevant social network. Moreover, being logged into (or having logged into) a relevant social network may cause the user to be an affiliated member of the relevant social network. Sharing an interest and/or opinion over a relevant social network may also cause the user to be an affiliated member of the relevant social network. Having an account and/or a profile on a relevant social network may cause the user to be an affiliated member of the relevant social network. For the purpose of illustration, at least one member affiliated with the relevant work social network (X) may become aware of the collaboration artifact 12.

The affiliated member may become aware of the collaboration artifact by any suitable mechanism, for example via an automatic notification using an electronic message, a text message, a link, and so on, or combinations thereof. In addition, the affiliated member may become aware by logging into the social network, or by accessing a shared folder and/or environment. For the purpose of illustration, each member affiliated with the relevant work social network (X) may also access the collaboration artifact 12, access communications between cooperating users (which may themselves be collaboration artifacts) related to the collaboration artifact 12, and so on, or combinations thereof. Where an affiliated member begins to cooperate, the affiliated member may be added to the set of users 16 and the relevant social networks 22 may be iteratively identified based on updated relationship strength 20 determinations.

Figure 2:
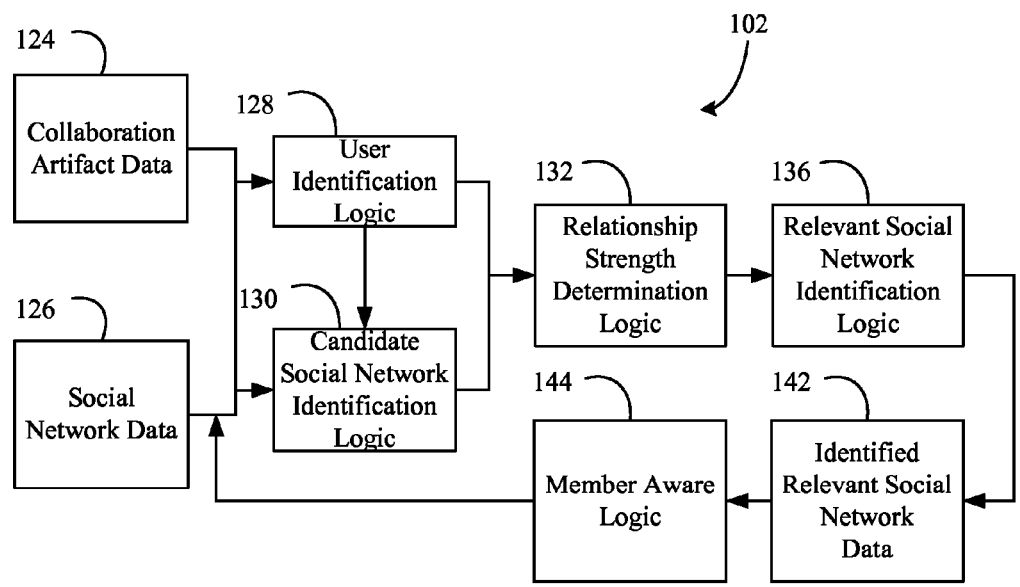
FIG. 2 is a block diagram of an example of an architecture including logic to identify one or more relevant social networks for one or more collaboration artifacts according to an embodiment.

FIG. 2 shows an architecture 102 that may be used to identify one or more relevant social networks for one or more collaboration artifacts according to an embodiment. In the illustrated example, collaboration artifact data 124 and/or social network data 126 may be identified and/or received. The collaboration artifact data 124 may include data related to an instant message, a chat, an email, a file, and a post, a presentation, a document, and so on, or combinations thereof. The collaboration artifact data 124 may also include any information related to identifying a cooperating user, such as a name, an address, an author, a recipient, a co-author, an originator, a reviewer, a participant, a tag, metadata, an access list, and so on, or combinations thereof.

User identification logic 128 may retrieve and/or receive the collaboration artifact data 124 to identify a set of users associated with one or more collaboration artifacts. For the purpose of illustration, the user identification logic 128 may identify that the collaboration artifact includes a presentation attached to an email. The user identification logic 128 may, for example, utilize presentation metadata to determine the authorship of the presentation as well as evaluate the email mailing list to determine the set of cooperating users. The user identification logic 128 may also evaluate elements in the presentation, such as notes and/or tracked changes, which may be cross-referenced with the names on the mailing list to refine the set of users. An access list may be used to identify what users may have access to resources, including to the collaboration artifact. In addition, geospatial information may be used to identify one or more users in the set of users, such as the physical proximity between each user. Accordingly, metadata, tags, access lists, and/or any identifying information associated with the presentation, the email, and/or the users in the mailing list may be evaluated for further characterization of the collaboration artifact and/or the cooperating users.

The social network data 126 may include any information related to an online social network, an intranet social network, an intern& social network, a web site, a group expressing a shared interest, a group communicating on a particular subject, a group expressing a relationship, a group having an established relationship, a group corresponding relatively frequently, a pre-existing social network, and so on, or combinations thereof. The social network data 126 may include any information related to identifying a candidate social network, such as a mailing list, a database access list (ACL), an organization chart, an organization group, a membership, a communication record, metadata, a static group, a dynamic group, a nested group, a hybrid group, a Lightweight Directory Access Protocol (LDAP) group, an opinion associated with a post, and so on, or combinations thereof.

Candidate social network identification logic 130 may retrieve and/or receive the social network data 126 to identify one or more candidate social networks. The candidate social network identification logic 130 may identify a candidate social network based on, for example, a mailing list such as an athletic mailing list, a political mailing list, a professional mailing list, an educational mailing list, and so on, or combinations thereof. The candidate social network identification logic 130 may identify a candidate social network based on, for example, an ACL, which may specify which users are to be granted access to objects and/or resources. The candidate social network identification logic 130 may identify a candidate social network based on, for example, a communication record such as a phone record and/or a chat record.

The candidate social network logic identification may identify a candidate social network base on, for example, a membership such as a community membership and/or gym membership. The candidate social network identification logic 130 may identify a candidate social network based on, for example, geospatial data such as the location of the users in the candidate social network. The candidate social network identification logic 130 may identify the candidate social network, for example, as a subset of the social networks (e.g., a subset of all the social networks) that include at least one user identified by the user identification logic 128. Accordingly, data generated by the user identification logic 128 may be retrieved and/or received by the candidate social network identification logic 130 to identify the candidate social networks.

Additionally, the candidate social network identification logic 130 may identify a candidate social network based on, for example, chart and/or group information such as an employment chart, a group chart, an activities chart, a group activity, and so on, or combinations thereof. A group may include a list and/or a collection of names, addresses, and so on, or combinations thereof. The group may include a Lightweight Directory Access Protocol (LDAP) group, wherein an LDAP server may run over Transmission Control Protocol/Internet Protocol (TCP/IP) as a directory service for both internet and non-internet applications. The group may include a static group, which may define each member individually. The group may include a dynamic group, which may define its members using an LDAP search. The group may include a nested group, which may enable the creation of hierarchical relationships that may be used to define inherited group membership. The group may include a hybrid group, which may include a combination of LDAP, static, dynamic, and nested member types. The candidate social network identification logic 130 may identify a candidate social network based on, for example, an opinion such as a "favorite" designation and/or a textual comment associated with a post.

Relationship strength determination logic 132 may retrieve and/or receive the set of users and the set of networks identified by the user identification logic 128 and the candidate social network identification logic 130, respectively. The relationship strength determination logic 132 may determine a relationship strength between the set of users associated with the one or more collaborations artifacts and each of the candidate social networks. A similarity metric may be calculated by the determination logic 132 to determine the relationship strength. The relationship strength determination logic 132 may also determine that the relationship strength is to hold a particular value based on a threshold, which may be set on a scale, set relatively high, set relatively low, and so on, or combinations thereof. The relationship strength may be determined by the relationship strength determination logic 132 to hold a particular value based on relative evaluations, for example involving a relative degree of overlap, and/or may be based on weight information, for example accounting for candidate social network relative size. The relationship strength determination logic 132 may employ any criteria to supplement the relationship strength determination (whether automatic or manual), such as user preference information, history information, network reliability information, member reliability information, and so on, or combinations thereof.

A relevant social network identification logic1 36 may retrieve and/or receive the relative strength information determined by the relationship strength determination logic 132. The relevant social network identification logic 136 may identify the relevant social network based on the relationship strength (e.g., strong, strongest, etc.) between the set of users associated with the one or more collaboration artifacts and the one or more candidate social networks. The relevant social network identification logic 136 may sort and/or select candidate social networks based on the relationship strength to identify the one or more relevant social networks from the candidate social networks, which may involve automatic implementation, manual implementation, and so on, or combinations thereof. The relevant social network identification logic 136 may evaluate any other criteria to identify a relevant social network, such as predetermined limitations, user preference information, history information, member reliability information, network reliability information, and so on, or combinations thereof. Identified relevant social network data 142 may be stored, provided to a user, provided to logic, and so on, or combinations thereof.

Member aware logic 144 may retrieve and/or receive the identified relevant social network data 142 generated by the relevant social network identification logic 136. The member aware logic 144 may enable the members affiliated with the relevant social network (e.g., all of the members, part of the members, etc.) to become aware of the collaboration artifact, whether or not they wish to cooperate. The member aware logic 144 may send an automatic notification about the collaboration artifact to one or more of the affiliated members according to, and/or may enable one or more users to set, notification preferences (e.g., preference for notifications, notification timing, notification filtering, manner of notification such as links or folders, etc.), to set notification security preferences (e.g., encryption, passwords, etc.), and so on, or combinations thereof. In addition, the member aware logic 144 may notify one or more users in the set of users about cooperating members, such as information related to an intention to cooperate.

The member aware logic 144 may also enable the members affiliated with the relevant social network (e.g., all of the members, part of the members, etc.) to access the one or more collaboration artifacts. The member aware logic 144 may enable the members affiliated with the relevant social network (e.g., all of the members, part of the members, etc.) to have and/or gain automatic access to one or more collaboration artifacts, secure access to one or more collaboration artifacts, appropriate access to one or more collaboration artifacts, and so on, or combinations thereof. The access may be provided by the member aware logic 144 though a path, by rendering the latest version of the collaboration artifact, and so on, or combinations thereof. The member aware logic 144 may provide access according to, and/or may enable the setting of, access preferences (e.g., prefer certain paths, access timing, access filtering, manner of access such as links or folders, etc.), access security preferences (e.g., encryption, passwords, etc.), access privilege preferences (e.g., read, write, etc.) and so on, or combinations thereof. In addition, the member aware logic 144 may add at least one affiliated member to the set of users, which may be fed back for iterative identification of the relevant social networks based on adaptively updated relationship strength determinations.

Figure 3:
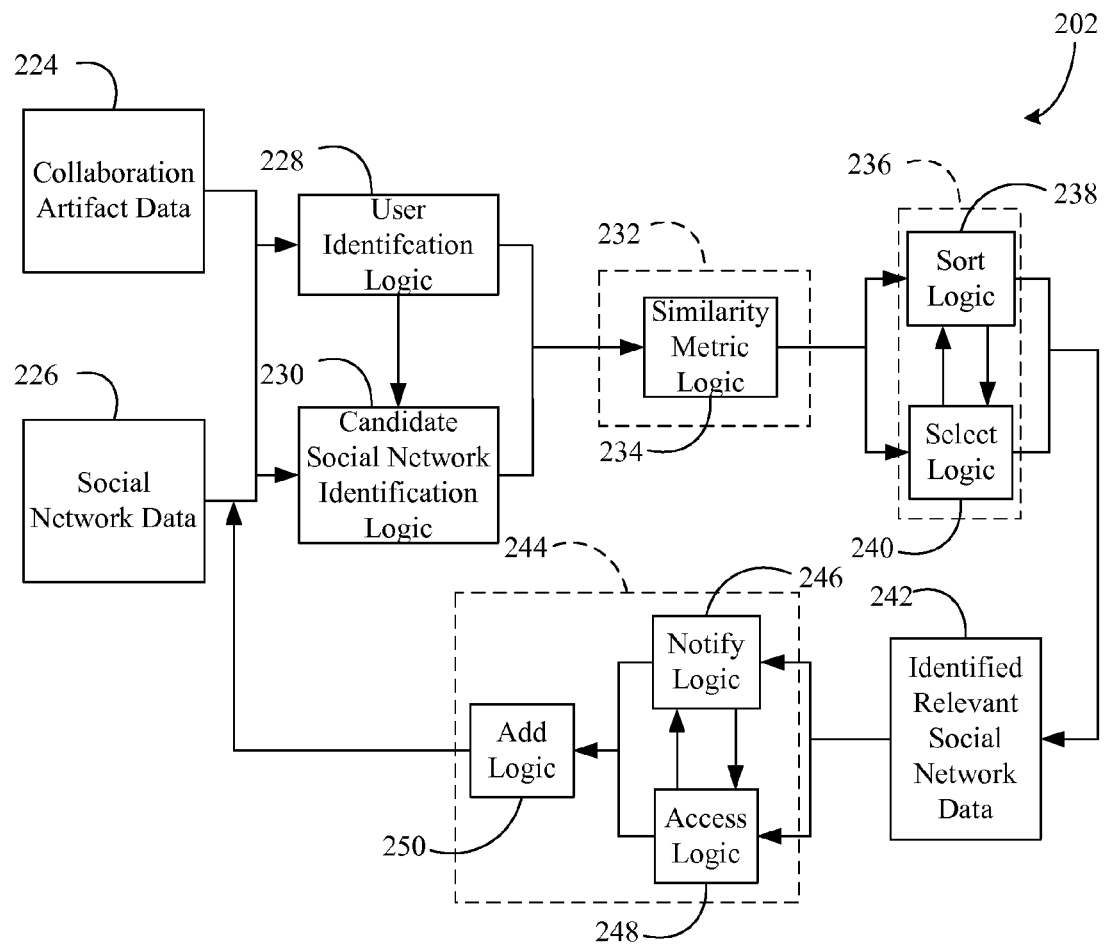
FIG. 3 is a block diagram of an example of an architecture including a variation in logic to identify one or more relevant social networks for one or more collaboration artifacts including according to an embodiment.

Turning now to FIG. 3, an architecture 202 is shown that may be used to identify one or more relevant social networks for one or more collaboration artifacts according to an embodiment. Logic components identified in the architecture 202 of FIG. 3 having similar reference numerals as those already discussed in the architecture 102 of FIG. 2 are to be understood to incorporate similar functionality. In this variation, the relationship strength determination logic 232 may include a similarity metric logic 234. The similarity logic 234 may calculate a similarity metric between a set of users associated with the one or more collaborations artifacts and each of the candidate social networks. The similarity metric may be used to identify one or more relevant social networks from the candidate social networks.

The similarity metric may be calculated by any suitable computation. In one example, the similarity metric may be calculated by employing a Jaccard Index, a Dice Coefficient, and so on, or combinations thereof. For example, {a,b,c} may generally represent a set of users including users (a), (b), and (c). The operation F∩J may generally represent a set that is the intersection of the sets F and J. The intersection of the two sets F and J may reference the collection of points (e.g., users) that are in the set F and that are also in the set J. The operation F∪J may generally represent a set that is the union of sets F and J. The union of the two sets F and J may reference the set that combines all elements of F and all elements of J. The operation |K| may generally represent the cardinality of set K, which may reference the number of members in set K.

For the purpose of illustration, a set of users (A) {Abe, Bertha, Charles, Diane} may be associated with a collaboration artifact (e.g., document). A set of networks including a plurality of candidate social networks may be identified. For example, candidate social network (X) {Abe, Betty, Courtney, Diane}, candidate social network (Y) {Abe, Betty, Charles, Diane, Edward}, and candidate social network (Z) {Abe, Betty, Charles, Diane, Edward, Frank, George, Harold, Ian} may be identified. Accordingly, a similarity metric between the set of users (A) associated with the collaboration artifact and each of the candidate social networks (X), (Y) and (Z) may be calculated to identify one or more relevant social networks for the collaboration artifact.

Applying the Jaccard Index, as shown in equation (1), may yield the following calculations for the candidate social network (X), as shown in equations (2) and (3), for the candidate social network (Y), as shown in equations (4) and (5), and for the candidate social network (Z), as shown in equations (6) and (7).

$$\frac{|F \cap J|}{|F \cup J|} \qquad (1)$$

$$\frac{|\{Abe, Bertha, Charles, Diane\} \cap \{Abe, Betty, Courtney, Diane\}|}{|\{Abe, Bertha, Charles, Diane\} \cup \{Abe, Betty, Courtney, Diane\}|} \qquad (2)$$

$$\frac{2}{6} \qquad (3)$$

$$\frac{|\{Abe, Bertha, Charles, Diane\} \cap \{Abe, Betty, Charles, Diane, Edward\}|}{|\{Abe, Bertha, Charles, Diane\} \cup \{Abe, Betty, Charles, Diane, Edward\}|} \qquad (4)$$

$$\frac{2}{5} \qquad (5)$$

$$\frac{\{Abe, Bertha, Charles, Diane\} \cap |\{Abe, Betty, Charles, Diane, Edward, Frank, George, Harold, Ian\}|}{\{Abe, Bertha, Charles, Diane\} \cup |\{Abe, Betty, Charles, Diane, Edward, Frank, George, Harold, Ian\}|} \qquad (6)$$

$$\frac{3}{10} \qquad (7)$$

Applying the Dice Coefficient, as shown in equation (8), may yield the following calculations for the candidate social network (X), as shown in equations (9) and (10), for the candidate social network (Y), as shown in equations (11) and (12), and for the candidate social network (Z), as shown in equations (13) and (14).

$$\frac{2|F \cap J|}{|F| + |J|} \qquad (8)$$

$$\frac{2|\{Abe, Bertha, Charles, Diane\} \cap \{Abe, Betty, Courtney, Diane\}|}{|\{Abe, Bertha, Charles, Diane\}| + |\{Abe, Betty, Courtney, Diane\}|} \qquad (9)$$

$$\frac{4}{8} \qquad (10)$$

$$\frac{2|\{Abe, Bertha, Charles, Diane\} \cap \{Abe, Betty, Charles, Diane, Edward\}|}{|\{Abe, Bertha, Charles, Diane\}| + |\{Abe, Betty, Charles, Diane, Edward\}|} \qquad (11)$$

$$\frac{3}{9} \qquad (12)$$

$$\frac{2|\{Abe, Bertha, Charles, Diane\} \cap \{Abe, Betty, Charles, Diane, Edward, Frank, George, Harold, Ian\}|}{|\{Abe, Bertha, Charles, Diane\}| + |\{Abe, Betty, Charles, Diane, Edward, Frank, George, Harold, Ian\}|} \qquad (13)$$

$$\frac{3}{13} \qquad (14)$$

In addition, the relevant social network identification logic 236 may include a sort logic 238 to sort each of the candidate social networks based on the similarity metric, to identify the relevant social networks from the candidate social networks. The sort logic 238 may implement partitioned ordering, separate ordering, mixed ordering, and so on, or combinations thereof. The sort logic 238 may implement sorting before, during, after, and/or irrespective of any selecting. The sort logic 238 may involve automatic sorting, manual sorting (e.g., via user input), and so on, or combinations thereof. For the purpose of illustration, the sort logic 236 may automatically sort the candidate social networks (X), (Y), and (Z) in descending order using the corresponding similarity metrics (e.g., converted and/or represented in decimal form, percentage form, etc.).

In one example employing the Jaccard Index, the candidate social network (Y) may be ordered first based on a calculated similarity metric of 0.40, the candidate social network (X) may be ordered second based on a calculated similarity metric of 0.33, and the candidate social network (Z) may be ordered third based on a calculated similarity metric of 0.30. In another example employing the Dice Cofficient, the candidate social network (X) may be order first based on a calculated similarity metric of 0.40, the candidate social network (Y) may be ordered second based on a calculated similarity metric of 0.33, and the candidate social network (Z) may be ordered third based on a calculated similarity metric of 0.23. In addition, the sort logic 238 may consider any other criteria (whether to implement manual and/or automatic sorting), such as predetermined limitations, user preference information, history information, member reliability information, network reliability information, and so on, or combinations thereof. For example, the sort logic 238 may consider user input to enable the user to manually sort the candidate social networks (X), (Y), and (Z). The sort logic 238 may also store and/or provide the sort as the part of relevant social network data 242.

The relevant social network identification logic 236 may also include a select logic 240 to select one or more of the candidate social networks based on the similarity metric, to identify the relevant social networks from the candidate social networks. The select logic 240 may implement selection before, during, after, and/or irrespective of any sorting. The select logic 240 may involve automatic selection, manual selection (e.g., via user input), and so on, or combinations thereof. In one example employing the Jaccard Index, the candidate social network (Y) may be automatically selected as the relevant social network for the collaboration artifact based on the calculated similarity metric of 0.40. In another example employing the Dice Coefficient, the candidate social network (X) may be automatically selected as the relevant social network for the collaboration artifact based on the calculated similarity metric of 0.40. In addition, the select logic 240 may consider any other criteria (whether to implement manual and/or automatic selecting), such as predetermined limitations, user preference information, history information, member reliability information, network reliability information, and so on, or combinations thereof. For example, the select logic 240 may consider user input to enable the user to manually select the candidate social networks (X), (Y), and (Z). The select logic 240 may also store and/or provide the selection as the part of the identified relevant social network data 242.

The member aware logic 244 may retrieve and/or receive the identified relevant social network data 242 generated by the sort logic 238 and/or the select logic 240 to make one or more members affiliated with the relevant social network aware of the collaboration artifact. The member aware logic 244 may include a notify logic 246 to make the affiliated members (e.g., all of the members, part of the members, etc.) aware of the collaboration artifact, whether or not they wish to cooperate. The notify logic 246 may send the affiliated members an automatic notification about the collaboration artifact. The notify logic 246 may notify according to, and/or enable one or more users to set, notification preferences. The notification preferences may include whether to cease and/or prevent automatic notifications, to prefer automatic notifications, to become aware by actively accepting automatic notifications, to become aware by actively searching in folders and/or shared environments for new and/or updated collaboration artifacts, to specify which users and/or groups may result in an automatic notifications, and so on, or combinations thereof.

The notify logic 246 may notify according to, and/or enable one or more users to set, timing preferences. The timing preferences may include providing the notification via the notify logic 246 immediately, on occurrence of an event (e.g., log into email, relevant social network, in respond to a request, etc.), and so on, or combinations thereof. The notify logic 246 may notify according to, and/or enable one or more users to set, set security preferences. The security preferences may include providing the notification via the notify logic 246 over a secure connection using encryption, tunneling, certificates, and so on, or combinations thereof. In addition, the notify logic 246 may notify one or more users in the set of users about changes related to the cooperating members, such as an intention to cooperate. The notify logic may also provide information to other logic, for example to indicate that a notification has been received by the members.

The member aware logic 244 may retrieve and/or receive the identified relevant social network data 242 generated by the sort logic 238 and/or the select logic 240 to enable access to one or more members affiliated with the relevant social network. The member aware logic 244 may include an access logic 248 to allow the affiliated members (e.g., all of the members, part of the members, etc.) automatic access, secure access, appropriate access, and so on, and combinations thereof. The access logic 248 may allow the affiliated member to have and/or gain automatic access to the collaboration artifact according to, and/or enable the setting of, access preferences. The access preferences may allow access through a path (e.g., link or address to a document, folder, shared environment, etc.), by directly providing the latest version of the collaboration artifact, and so on, or combinations thereof.

The access logic 248 may provide secure access to the collaboration artifact according to, and/or enable the setting of, security preferences. The security preferences may provide and/or verify encryption, tunneling, certificates, and so on, or combinations thereof. The access logic 248 may also provide an appropriate level of access to the collaboration artifact according to, and/or enable the setting of, privilege preferences. The privilege preferences may provide assignment and/or verification of cooperation rights, such as read privileges, write privileges, review privileges, and so on, or combinations thereof. In addition, the access logic 248 may communicate with the notify logic 246 to provide information, such as the changes related to cooperating members (e.g., about the affiliated member that intends to cooperate).

The member aware logic 244 may include an add logic 250 to add one or more affiliated members to the set of users. The affiliated members may be added based on the classification as a member (e.g., of the group, of the social network web site, etc.), based on being notified (e.g., received notification), based on an intent to cooperate (e.g., accepting a notification), based on actually cooperating (e.g., actually reviewing, editing, etc.), based on accessing a shared folder and/or environment, and so on, or combinations thereof. The add logic 250 may add one or more members to the set of users to iteratively identify relevant social networks based on adaptively updated similarity metric calculations.

Figure 4:
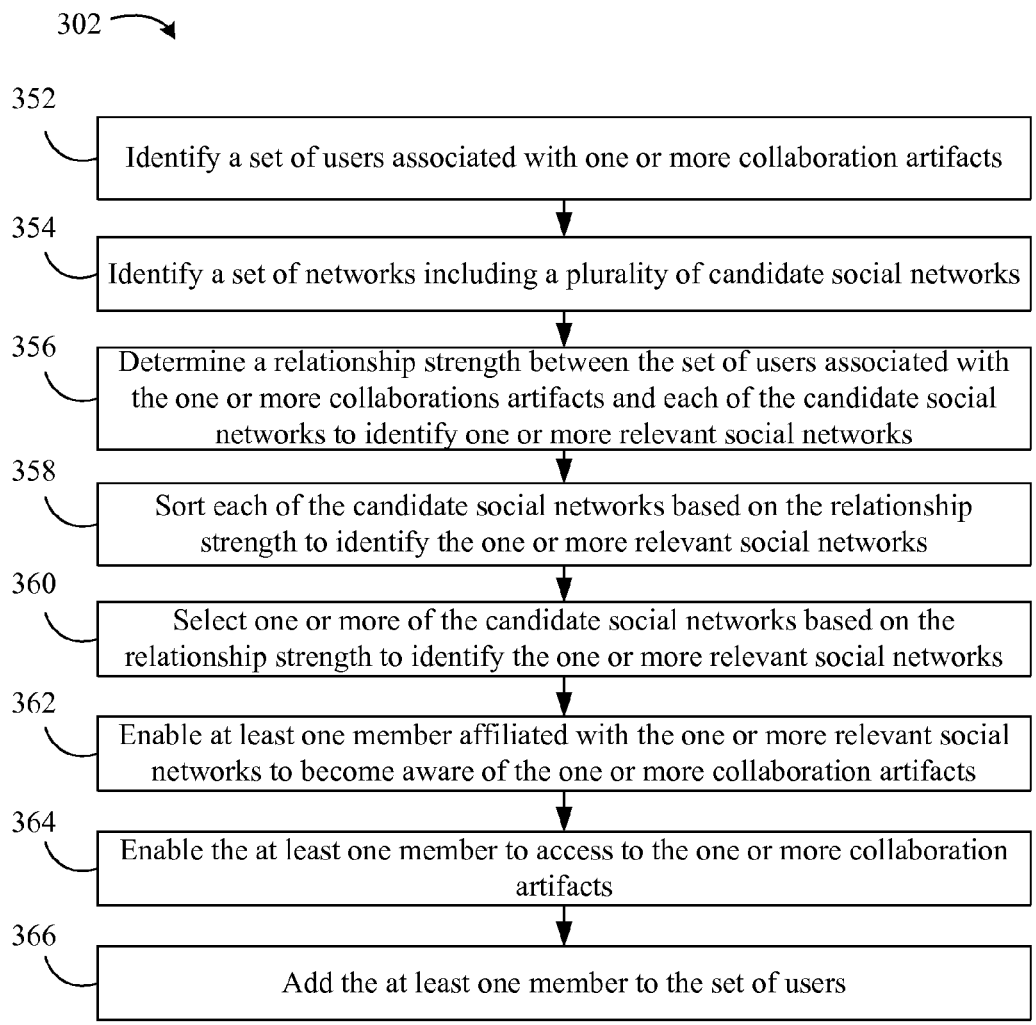
FIG. 4 is a flowchart of an example of a method of identifying one or more relevant social networks for one or more collaboration artifacts according to an embodiment.

FIG. 4 shows a method 302 of identifying one or more relevant social networks for one or more collaboration artifacts according to an embodiment. Illustrated processing block 352 provides for identifying a set of users associated with one or more collaboration artifacts. The set of users identified in block 352 may correspond to, for example, the set of users (A) and/or (B) (e.g., FIG. 1 and/or FIG. 3), already discussed. A set of networks including a plurality of candidate social networks may be identified at block 354, wherein the plurality of candidate social networks at block 354 may correspond to, for example, the candidate social networks (X), (Y), and/or (Z) (e.g., FIG. 1 and/or FIG. 3), already discussed. Block 356 may provide for determining a relationship strength (e.g., a similarity metric) between the set of users associated with the collaboration artifacts and each of the candidate social networks to identify one or more relevant social networks for the collaboration artifact. Thus, for example, the relationship strength between the set of user (A) and the candidate social networks (X), (Y), and/or (Z) may be used to identify the candidate social networks (X) and (Y) as the relevant social networks (e.g., FIG. 1 and/or FIG. 3), already discussed.

The method 302 may also sort each of the candidate social networks based on the relationship strength to identify the relevant social networks at block 356, wherein the plurality of candidate social networks sorted may correspond to, for example, the plurality of candidate social networks (X), (Y), and/or (Z) (e.g., FIG. 1 and/or FIG. 3), already discussed. The method 302 may also select the candidate social networks based on the relationship strength to identify the relevant social networks at block 360, wherein the plurality of candidate social networks selected may correspond to, for example, the plurality of candidate social networks (X), (Y), and/or (Z) (e.g., FIG. 1 and/or FIG. 3), already discussed. At least one member affiliated with the relevant social networks may become aware of the collaboration artifacts. Thus, for example, at least one member affiliated with the relevant social networks (X) and/or (Y) (e.g., FIG. 1 and/or FIG. 3) may become aware of the one or more collaboration artifacts, already discussed.

At least one member affiliated with the relevant social networks may also have and/or gain access to the collaboration artifacts at block 364. For example, at least one member affiliated with the relevant social networks (X) and/or (Y) (e.g., FIG. 1 and/or FIG. 3) may have and/or gain access to the collaboration artifacts, already discussed. Block 366 provides for adding one or more affiliated members to the set of users. Thus, for example, at least one member affiliated with the relevant social networks (X) and/or (Y) may be added to the set of users (A) and/or (B) (e.g., FIG. 1 and/or FIG. 3), already discussed.

Figure 5:
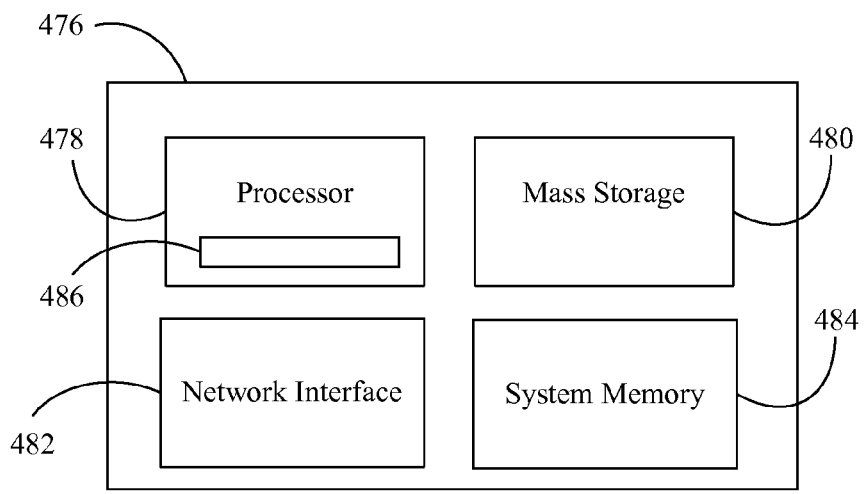
FIG. 5 is a block diagram of an example of a computing device according to an embodiment.

FIG. 5 shows a computing device 476 having a processor 478, mass storage 480 (e.g., read only memory/ROM, optical disk, flash memory), a network interface 482, and system memory 484 (e.g., random access memory/RAM). In the illustrated example, the processor 478 is configured to execute logic 486, wherein the logic 486 may implement one or more aspects of the scheme 10 (FIG. 1), the architecture 102 (FIG. 2), the architecture 202 (FIG. 3), and/or the method 302 (FIG. 4), already discussed. Thus, the logic 486 may enable the computing device 476 to function to identify one or more relevant social networks for one or more collaboration artifacts. The logic 486 may also be implemented as a software application that is distributed among many computers (e.g., local or remote). Thus, while a single computer could provide the functionality described herein, systems implementing these features can use many interconnected computers (e.g., for scalability as well as modular implementation).

Techniques described herein may therefore provide for identifying one or more relevant social networks for one or more collaboration artifacts. The identification may involve more than a mere association of a user to a social network. The identification may implement an evaluation of a relationship strength between the users associated with a collaboration artifact and a candidate social network. In addition, the identification may involve evaluating a plurality of candidate social networks, instead of merely recognizing an association and/or relationship between the user and candidate social network. Moreover, the identification may involve determining and/or maintaining an association between the users and a collaboration artifact to identify the relevant social networks for the collaboration artifact itself. Accordingly, associating a user and/or the collaboration artifact with a social network by evaluating the degree of proximity, relatedness, and/or closeness in the association may maximize a quality and/or quantity of the cooperating users. Thus, inefficiencies in achieving the goal and/or purpose of the collaboration artifact may arise may be minimized.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A computer program product comprising:
a non-transitory computer readable storage medium; and
computer usable code stored on the computer readable storage medium, wherein when the computer usable code is executed by a processor, the computer usable code causes a computer to:

identify a set of users associated with at least one collaboration artifact;

identify a set of networks including a plurality of candidate social Internet or intranet networks; and calculate a similarity metric between the set of users associated with the at least one collaboration artifact, the at least one collaboration artifact comprising at least a work product that enables cooperation between two or more users, and each of the candidate social Internet or intranet networks to identify at least one relevant social Internet or intranet network from the candidate social Internet or intranet networks, wherein at least one member affiliated with the at least one relevant social Internet or intranet network is to become aware of the at least one collaboration artifact.

2. The computer program product of claim 1, wherein the computer usable code, when executed, further causes a computer to calculate the similarity metric by a Jaccard Index.

3. The computer program product of claim 1, wherein the computer usable code, when executed, further causes a computer to sort each of the candidate social Internet or intranet networks based on the similarity metric to identify the at least one relevant social Internet or intranet network from the candidate social Internet or intranet networks.

4. The computer program product of claim 1, wherein the computer usable code, when executed, further causes a computer to select at least one of the candidate social Internet or intranet networks based on the similarity metric to identify the at least one relevant social Internet or intranet network from the candidate social Internet or intranet networks.

5. The computer program product of claim 1, wherein the computer usable code, when executed, further causes a computer to automatically notify the at least one member about the at least one collaboration artifact.

6. A computer program product comprising:

a non-transitory computer readable storage medium; and computer usable code stored on the computer readable storage medium, wherein when the computer usable code is executed by a processor, the computer usable code causes a computer to:

identify a set of users associated with at least one collaboration artifact;

identify a set of networks including a plurality of candidate social Internet or intranet networks; and determine a relationship strength between the set of users associated with the at least one collaboration artifact, the at least one collaboration artifact comprising at least a work product that enables cooperation between two or more users, and each of the candidate social Internet or intranet networks to identify at least one relevant social Internet or intranet network from the candidate social Internet or intranet networks.

7. The computer program product of claim 6, wherein the computer usable code, when executed, further causes a computer to calculate a similarity metric between the set of users associated with the at least one collaboration artifact and each of the candidate social Internet or intranet networks to determine the relationship strength.

8. The computer program product of claim 6, wherein the computer usable code, when executed, further causes a computer to:

sort each of the candidate social Internet or intranet networks based on the relationship strength to identify the at least one relevant social Internet or intranet network from the candidate social Internet or intranet networks; and select at least one of the candidate social Internet or intranet networks based on the relationship strength to identify the at least one relevant social Internet or intranet network from the candidate social Internet or intranet networks.

9. The computer program product of claim 6, wherein the computer usable code, when executed, further causes a computer to:

enable at least one member affiliated with the at least one relevant social Internet or intranet network to become aware of the at least one collaboration artifacts; and automatically notify the at least one member about the at least one collaboration artifact.

10. The computer program product of claim 1, wherein the computer usable code, when executed, further causes a computer to calculate the similarity metric by a Dice Coefficient.

11. The computer program product of claim 1, wherein the work product is selected from a group consisting of a document, an instant message, a chat, an e-mail, a file, and a post.

12. The computer program product of claim 6, wherein the work product is selected from a group consisting of a document, an instant message, a chat, an e-mail, a file, and a post.

* * * * *